(12) United States Patent
Simpson

(10) Patent No.: US 7,777,872 B2
(45) Date of Patent: Aug. 17, 2010

(54) METHOD OF MEASURING DIFFRACTIVE LENSES

(75) Inventor: Michael J. Simpson, Arlington, TX (US)

(73) Assignee: Alcon Research, Ltd., Fort Worth, TX (US)

(*) Notice: Subject to any disclaimer, the term of this patent is extended or adjusted under 35 U.S.C. 154(b) by 0 days.

(21) Appl. No.: 12/181,889

(22) Filed: Jul. 29, 2008

(65) Prior Publication Data
US 2009/0033920 A1 Feb. 5, 2009

Related U.S. Application Data

(60) Provisional application No. 60/952,913, filed on Jul. 31, 2007.

(51) Int. Cl.
*G01B 9/00* (2006.01)
(52) U.S. Cl. ............... 356/124; 351/161; 351/168; 351/221; 356/128; 356/512; 356/521
(58) Field of Classification Search ......... 356/124–128, 356/512–521; 351/161–168, 205–221
See application file for complete search history.

(56) References Cited

U.S. PATENT DOCUMENTS 6,709,108 B2* 3/2004 Levine et al. ............... 351/211
7,455,404 B2* 11/2008 Bandhauer et al. .......... 351/168
2002/0196428 A1* 12/2002 Yamagata et al. ........... 356/124

OTHER PUBLICATIONS

Toto et al, "Visual performance and biocompatibility of 2 multifocal diffractive IOLs: Six-month comparative study"; J. of Cataract & Refractive Surgery; 33:8; 1419-1425; 2007; URL address: http://dx.doi.org/10.1016/j.jcrs.2007.05.010>.
Neal et al, "Effect of lenslet resolution on the accuracy of ocular wavefront measurements"; PROC. SPIE; 4245:78; 78-91; 2003; URL address: http://dx.doi.org/10.1117/12.429285>.

* cited by examiner

*Primary Examiner*—Gregory J Toatley, Jr.
*Assistant Examiner*—Iyabo S Alli
(74) *Attorney, Agent, or Firm*—Armando Pastrana, Jr.

(57) ABSTRACT

A method for measuring the optical properties of multifocal ophthalmic lenses. Collimated light is passed through an ophthalmic lens and onto an array of lenslets. Light exiting the array of lenslets is detected by a sensor. Blurred spots and/or double spots may represent diffractive zones of the wavefront. A centroid of the spot or a brighter of two spots may be used to determine the lateral position of the spot. Theoretical calculations, laboratory measurements, clinical measurements and experimental image spots may be generated, compared and cross-checked to determine a monofocal equivalent lens. A Modulation Transfer Function (MTF) may be used to evaluate and compare a diffractive lens and a monofocal equivalent lens.

16 Claims, 9 Drawing Sheets

FIG. 4

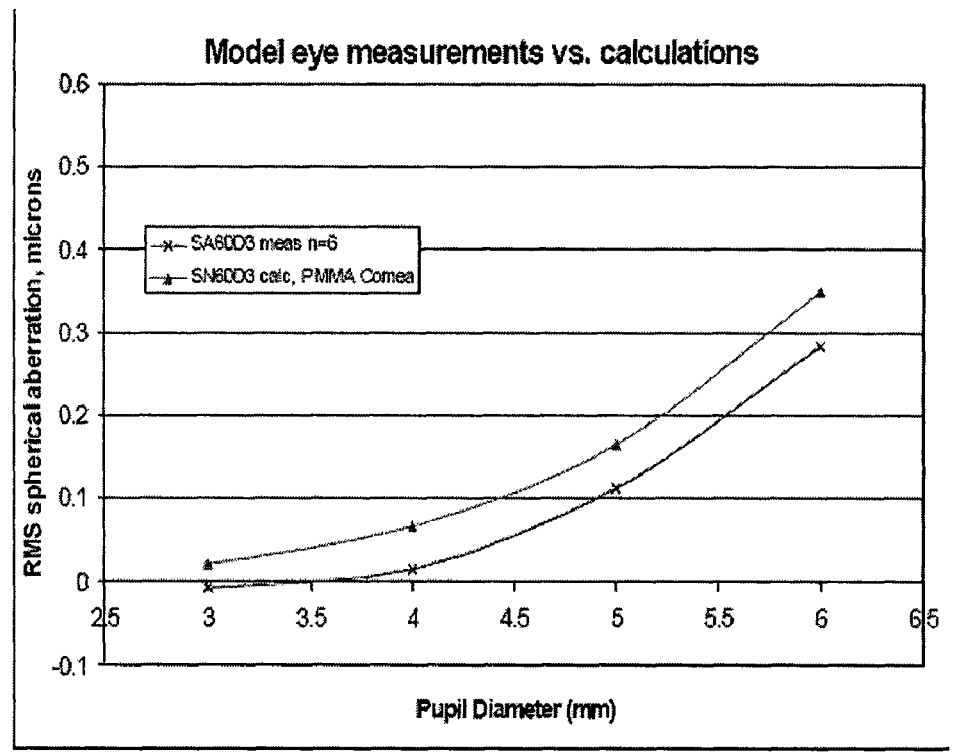
FIG. 13
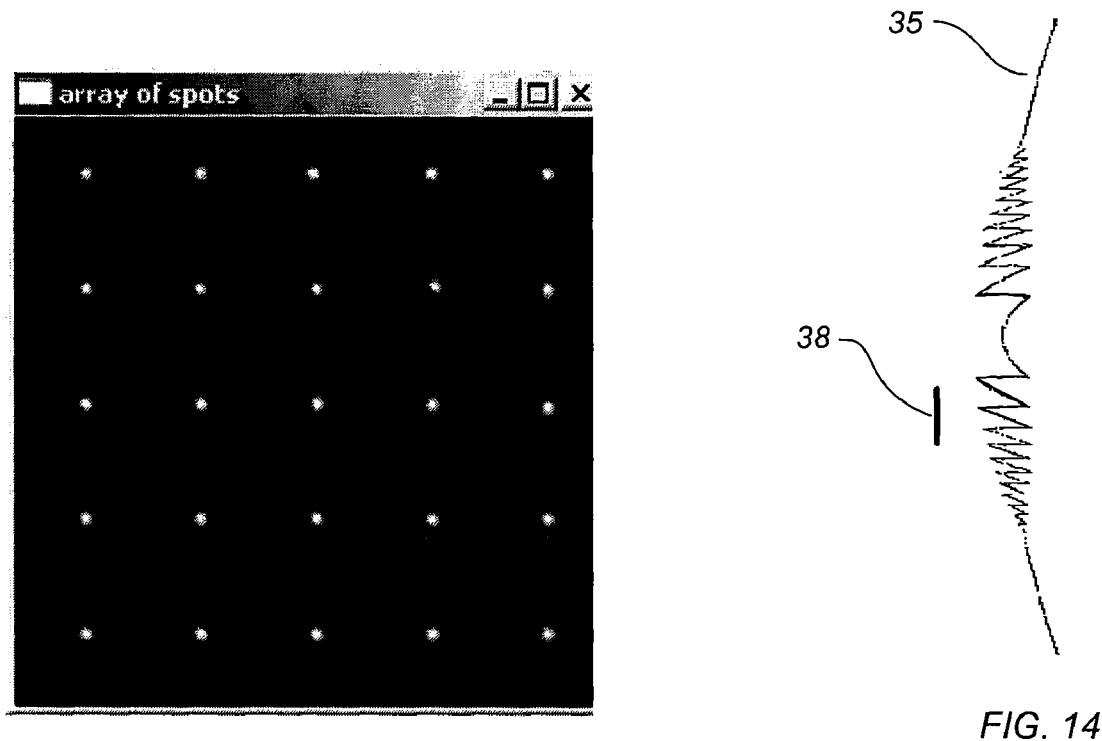
FIG. 16
FIG. 14

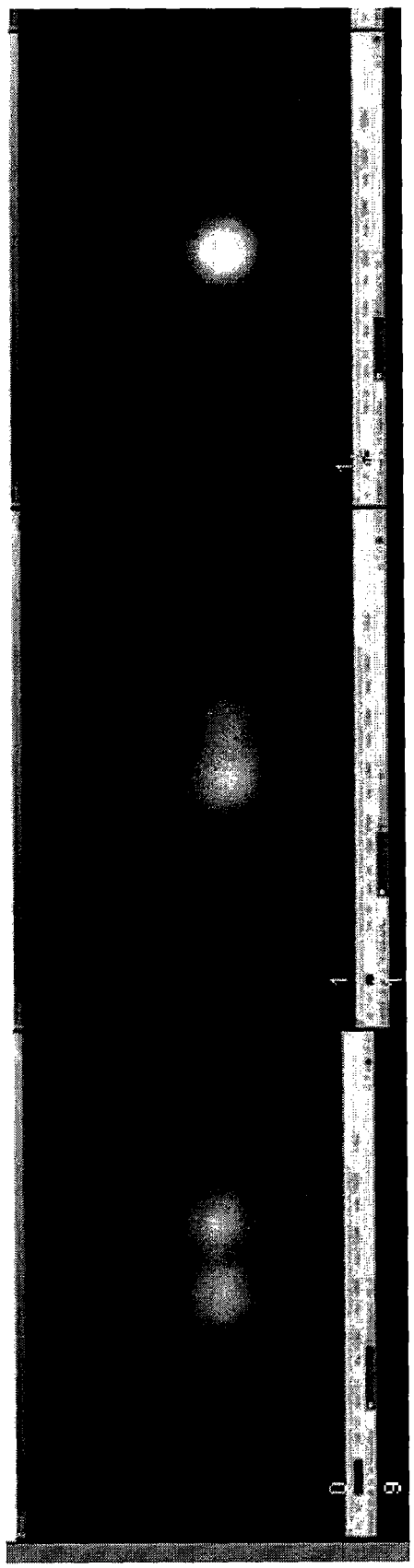

METHOD OF MEASURING DIFFRACTIVE LENSES

CROSS-REFERENCE TO RELATED APPLICATIONS

This application claims priority from Provisional Patent Applications No. 60/952,913, filed Jul. 31, 2007, entitled "METHOD OF MEASURING DIFFRACTIVE LENSES," the entire contents of which are expressly incorporated herein by reference for all purposes.

TECHNICAL FIELD

The present invention relates generally to diffractive ophthalmic lenses, and to a method of measuring the optical properties of a diffractive lens.

BACKGROUND

Diffractive lenses typically utilize diffractive "zones" that break up an optical wavefront with discontinuities. The lateral separations between the zone boundaries, and the optical phase delays at the zone boundaries, combine together to redirect the light in a controlled manner. The optical wavefront itself is typically discontinuous just after passing through a diffractive lens, unlike the situation for a conventional optical imaging system where the wavefront is typically smooth and continuous.

The optical wavefront of a conventional monofocal imaging system can be used to determine the optical properties of an image created by the system. The wavefront can be used to calculate the point spread function, the modulation transfer function, or a variety of other measures of image quality. One method that can be used to measure the wavefront of a conventional lens is a Shack-Hartmann system, where the wavefront illuminates an array of small lenslets. The light that passes through each lenslet comes to a focus, and if the local wavefront is tilted, the focused spot is displaced laterally by a distance that represents the local slope of the lens over the region of the lenslet. The slopes of the wavefront are measured for all the lenslets in this manner, and the slopes are combined to create the wavefront. This method has been used in many fields, and it has recently become popular in ophthalmology, where it can be used to measure the wavefront quality of the human eye.

Problems arise when a lenslet array is used to measure a diffractive lens, because the method can only measure local wavefront slopes, and it does not measure the zonal optical discontinuities that are a feature of diffractive lenses. A similar limitation exists for a Fresnel lens, which is a monofocal lens where the physical bulk of the lens is reduced by shifting the lens surface in the axial direction. These shifts can be at arbitrary locations, and they can have arbitrary optical phase delays for a Fresnel lens. The surface slope of the lens at any location is similar to the surface slope of the original lens, but phase discontinuities have been introduced that affect the optical properties.

One particular ophthalmic use of diffractive lenses is as an intraocular lens. Intraocular lenses ("IOLs") are routinely implanted in patients' eyes during cataract surgery to compensate for the lost optical power that results when the natural lens is removed. The terms "intraocular lens" and its abbreviation IOL are used interchangeably herein to describe lenses that are implanted into the interior of an eye to either replace the natural lens or to otherwise augment vision regardless of whether or not the natural lens is removed. They provide an optical power for correcting a refractive error of the natural eye. Many different types of intraocular lenses exist for treating a variety of conditions to provide a patient with corrected vision.

Diffractive lenses can diffract light simultaneously into several directions, also typically known as diffraction orders. In multifocal intraocular lenses, two diffraction orders can be utilized to provide a patient with two optical powers: one for distance vision and one for near vision. Such diffractive Intraocular lenses are typically designed to have an "add" power that provides a separation between the far focus and the near focus. In this manner, a diffractive IOL can provide a patient with vision over a range of object distances.

When a diffractive IOL is implanted into an eye it affects the wavefront in the manner described above. Measurements using a lenslet array are affected by the discontinuities in the wavefront.

SUMMARY

A method is desirable for diffractive lenses to compensate for the optical effects due to the fact that the wavefront is not smooth and continuous like that of a conventional monofocal lens, and the local slopes of individual zones, and discontinuities at the diffractive steps affect the spot locations.

Some embodiments describe a system and method for measuring the optical properties of a diffractive lens. In some embodiments, a method for measuring the optical properties of a diffractive lens may measure diffractive lenses that have toric or aspheric components. The method may include sampling regions of the wavefront of a diffractive lens. A wavefront of a diffractive lens has discontinuities and a sample of the wavefront may not be fine enough to measure the true wavefront. For example, in ophthalmology, sampling generally involves coarse sampling that tends to cross zone boundaries. Coarse sampling may require some correction or conversion.

Some embodiments describe a method for measuring optical properties of an intraocular lens (IOL). Some embodiments disclosed herein may provide a method for measuring optical properties of a diffractive lens, comprising passing light through the diffractive lens and onto an array of lenslets, measuring one or more properties of the diffractive lens based on the light generally focused by the array of lenslets and detected by a sensor, and adjusting the measured result to compensate for expected optical properties of the diffractive component of the lens in the measurement system. In some embodiments, each lenslet receives a portion of the light and the diffractive lens has a zone boundary covering at least a portion of one lenslet. In some embodiments, a method further comprises comparing the position of a light spot focused by each lenslet with the position of the spot for a perfect collimated wavefront, to determine the lateral movement of the spot. In some embodiments, the effect of the diffractive structure is calculated utilizing the Fourier transform of the wavefront across each lenslet for the phase delay introduced by the diffractive structure. In some embodiments, the effect of the diffractive structure is determined by comparing the measured values for both a diffractive lens and a monofocal-equivalent lens to determine the correction. In some embodiments, a method further comprises identifying blurry or double spots are identified and adjusting the local slope for the lenslet to represent the monofocal equivalent lens. The presence of a blurry or double spot indicates the presence of a diffractive portion of the surface of the lens. In some embodiments, the step of comparing the determined one or more properties of the diffractive lens against one or more expected properties of the diffractive lens comprises determining a monofocal equivalent lens. In some embodiments, determining a monofocal equivalent lens comprises comparing theoretical calculations and laboratory measurements. In some embodiments, determining a monofocal equivalent lens comprises comparing theoretical calculations and clinical measurements. In some embodiments, a method further comprises cross-checking two or more of theoretical calculations, laboratory measurements, and clinical measurements. In some embodiments, a method further comprises analyzing a portion of the wavefront. In some embodiments, the step of comparing the determined one or more properties of the diffractive lens against one or more expected properties of the diffractive lens comprises estimating the theoretical distortion of the data based on the lens design and compensating for the estimation of the theoretical distortion. In some embodiments, the step of comparing the determined one or more properties of the diffractive lens against one or more expected properties of the diffractive lens comprises calculating the approximate lens region that would cover a lenslet to estimate the magnitude of a double spot.

Some embodiments disclosed herein may provide a method for measuring optical properties of a diffractive lens, comprising passing light through the diffractive lens, wherein the diffractive lens has a zone boundary covering at least a portion of one lenslet, using a system designed for measuring optical properties of a lens, measuring one or more properties of the diffractive lens based on the light exited from the lens, calculating one or more properties of the diffractive lens to determine an expected one or more properties of the diffractive lens, comparing the determined one or more properties of the diffractive lens against the one or more theoretical calculations of the diffractive lens, calculating one or more properties of the system used to measure the properties of a lens, measuring one or more properties of the system used to measure the properties of a diffractive lens, and correcting the measurement of one or more properties of the diffractive lens based on the comparison against the one or more expected properties of the diffractive lens and the one or more properties of the system for measuring properties of a lens. In some embodiments, the step of measuring one or more properties of the diffractive lens comprises measuring the spherical aberration of a diffractive lens.

Embodiments of methods for measuring diffractive lenses can be applied to Fresnel lenses, to monofocal and multifocal diffractive lenses, and to other zonal lenses such as zonal refractive multifocal IOLs. Zonal refractive lenses may not have discontinuities in the optical phase at a zone boundary, and may primarily have a change in the slope of the wavefront.

Other objects and advantages of the embodiments disclosed herein will be better appreciated and understood when considered in conjunction with the following description and the accompanying drawings.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein:

FIG. 4 depicts an example of a LADARWave® screen that plots measured Zernike values for a lens in a model eye with a small amount of defocus;

FIG. 13 depicts graphical representations of model eye measurements compared with calculations for diffractive lenses having various pupil diameters;

FIG. 14 depicts a sketch of a wavefront for one embodiment of a diffractive lens;

FIGS. 15A, B, C depict screen shots of experimental image spots that may be used to cross-check measurement methods; and FIG. 16 depicts a screenshot of calculations for one quadrant of an array of spots.

Figure 1:
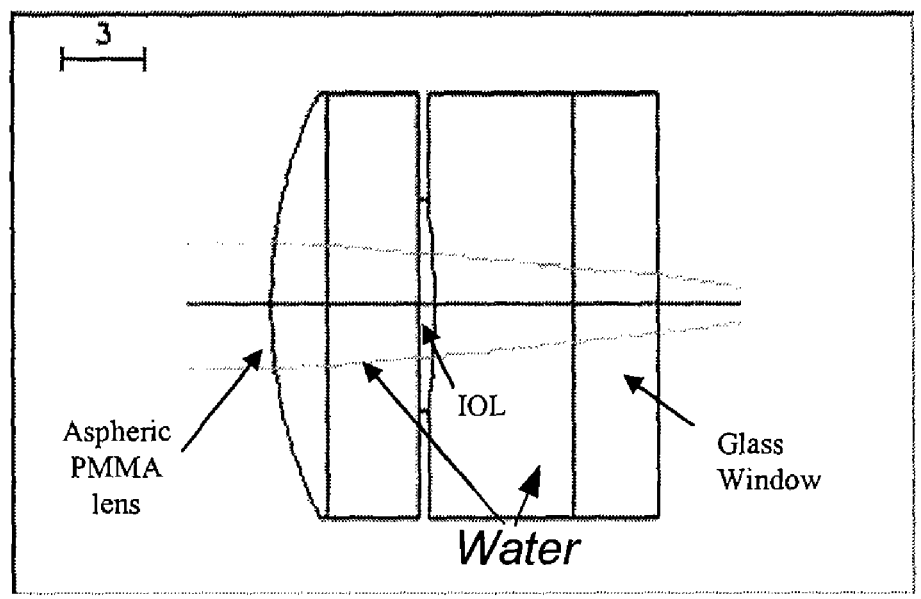
FIGS. 1 and 2 depict schematic diagrams of embodiments of model eyes.

While this disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but to the contrary, the intention is to cover all modifications, equivalents and alternatives falling within the spirit and scope of the present disclosure as defined by the appended claims.

DETAILED DESCRIPTION

The inventive system and method for measuring diffractive lenses and the various features and advantageous details thereof are explained more fully with reference to the non-limiting embodiments detailed in the following description. Descriptions of well known starting materials, manufacturing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, and additions within the scope of the underlying inventive concept(s) will become apparent to those skilled in the art after reading this disclosure. Skilled artisans can also appreciate that the drawings disclosed herein are not necessarily drawn to scale.

As used herein, the terms "comprises," "comprising," "includes," "including," "has," "having," or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example", "for instance", "e.g.", "in one embodiment".

Various embodiments are illustrated in the FIGURES, like numerals being used to refer to like and corresponding parts of the various drawings.

Some embodiments disclosed herein provide systems and methods for measuring optical properties of diffractive lenses. A diffractive lens has zone boundaries between diffractive zones and may also have non-diffractive zones. In some embodiments, a wavefront measurement can be used to evaluate the optical properties across the surface of a lens, and these optical properties can be used to evaluate the optical performance or to identify the specific cause of image quality variations.

A lens having diffractive zones may be positioned in a system for measuring optical properties of lenses. A light source may be directed towards the lens, and the light may also pass through a relay lens, if included. The result may be compared with projected light passed through a lens having non-diffractive surfaces, in order to determine the effect of the diffractive component. Those skilled in the art will appreciate that these teachings may apply equally to a variety of other applications, such as light being reflected off a retina in a patient to act as the source of light for wavefront measurement of the eye.

Some embodiments disclosed herein provide methods for measuring optical properties of diffractive lenses. In some embodiments, a Hartmann-Shack system may be used to measure optical properties of a lens. One solution to the problem of using a Hartmann-Shack system to measure diffractive lenses may be to estimate the theoretical distortion of the data based on the lens design and then provide compensation in the system software. In some embodiments, the direction of the distortion for a double spot may be determined from the double spot itself, since the direction of the deviation in the wavefront is in the direction of the double spot. In some embodiments, the magnitude of the distortion for a double spot may include calculating the approximate lens region that would cover a lenslet in that region of the array.

One embodiment of a system for measuring optical properties of a diffractive lens may provide image spots from a diffractive lens. Comparisons of spot intensities from a clear lens and spot intensities for a diffractive lens can be used to measure optical properties. One embodiment of a method of calculating the distortion for a double spot may include scaling the lateral displacement of the spot of the diffractive lens by a factor determined from the calculated spot intensity distribution.

In some embodiments, a method of measuring diffractive lenses may include calculating the effect of the shift for the brighter spot at each lenslet and to apply a correction to the data along the line of each blurred or smeared spot.

In some embodiments, measurements may be performed in a laboratory using a model eye. In some embodiments, measurements may be performed in a clinic. In some embodiments, measurements may be performed on a real eye in a patient.

One example of a multifocal diffractive IOL is the ReSTOR® apodized diffractive lens, manufactured by Alcon Laboratories, Inc., of Fort Worth, Tex. This lens has a central apodized diffractive region that is surrounded by a region without diffractive zones. Those skilled in the art will appreciate that other monofocal and multifocal diffractive lenses, including intraocular lenses, may be measured using embodiments disclosed herein.

Figure 2:
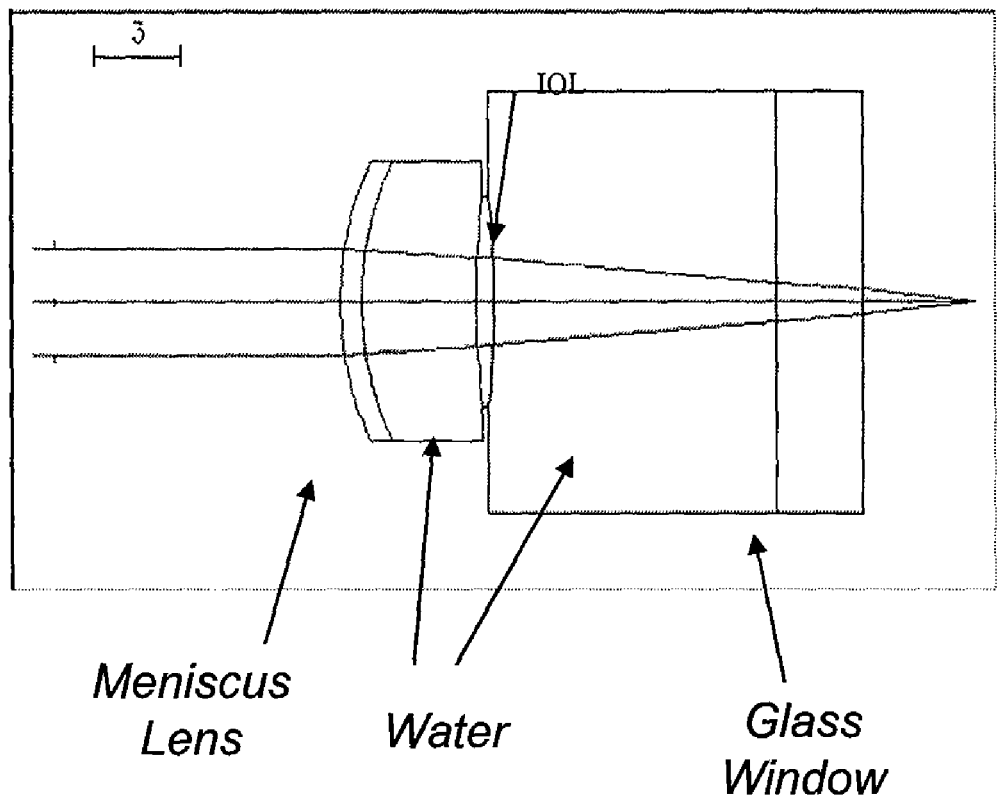

FIGS. 1 and 2 depict schematic diagrams of embodiments of model eyes. In some embodiments, a model eye may be used to simulate the use of a diffractive lens in a patient. The model eye may simulate the cornea with a convex-plano lens, since this can be fabricated accurately from PMMA with the correct level of aberration, such as shown in FIG. 1. The plano surface of the convex-plano cornea may act as the front window of the wet cell in which a lens under test may be positioned. The axial location of the lens may be set to model the optical arrangement of the average human eye. In some embodiments, a meniscus PMMA cornea can also be used in a model eye, such as shown in FIG. 2.

Embodiments of measuring a lens may include manufacturing a physical model eye to simulate a human eye. In some embodiments, cornea lenses for use in a model eye may be fabricated on a diamond turning lathe with asphericity designed to give a Zernike coefficient for spherical aberration that matches a typical human eye. In some embodiments, Zernike rms spherical aberration over a 6 mm entrance pupil for the cornea of an eye may be around 0.285 microns. The cornea lens may be based on an average patient cornea. The convex-plano cornea lens may have a radius of 11.445 mm and a thickness of 2.0 mm. The conic constant of this cornea may be 0.5188. The design value for the Zernike spherical aberration term of the cornea may be 0.285 µm for a 6 mm pupil (in water).

In some embodiments, a model eye may be designed and fabricated so that it can be measured by an ophthalmic wavefront measurement system, such as the LADARWave® system. In some embodiments, the location of diffractive lens 32 may be determined by performing a theoretical raytrace of the model eye to calculate the desired physical location.

Figure 3:
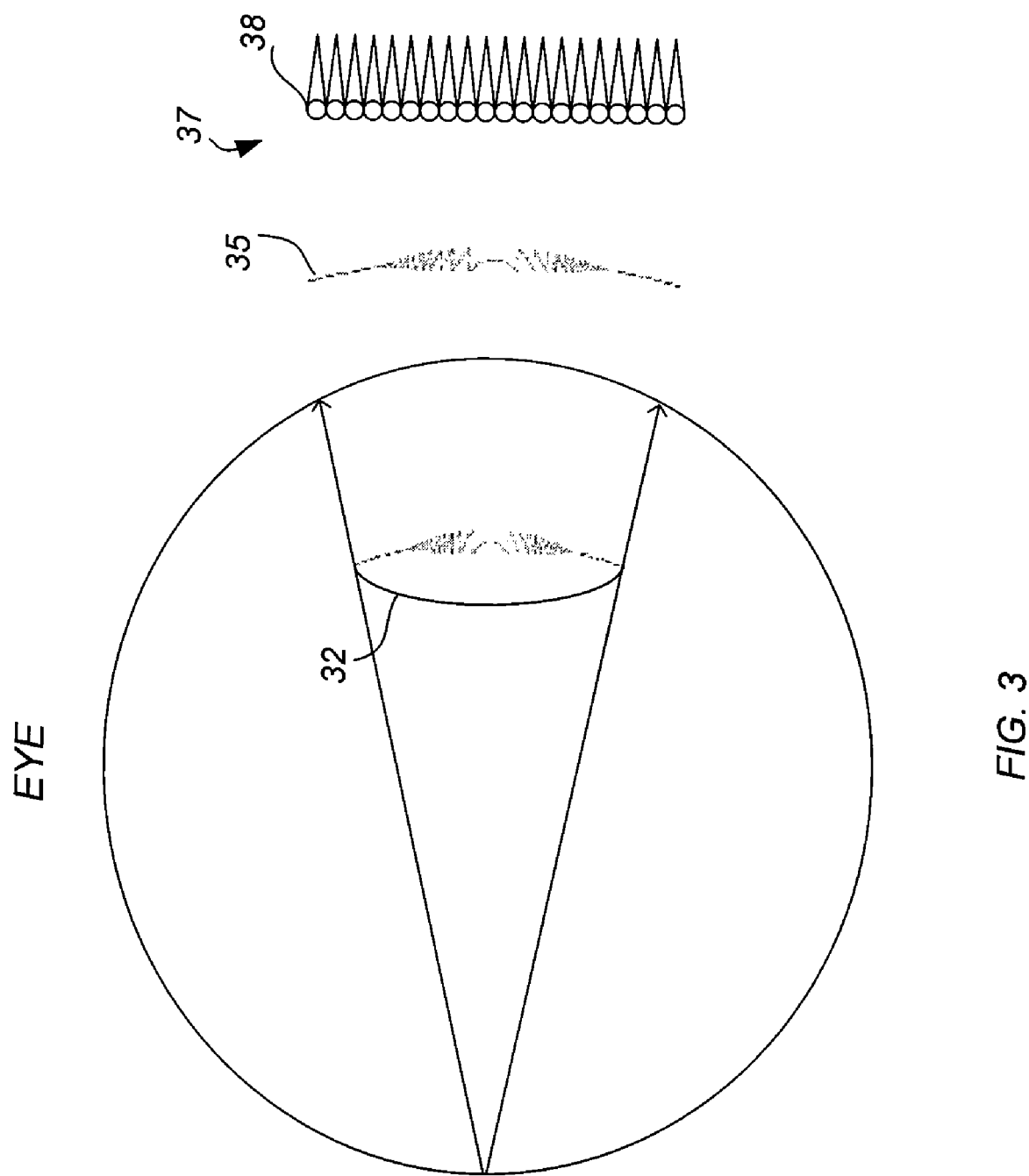
FIG. 3 depicts a schematic view of one embodiment of a system that may be used to measure optical properties of diffractive intraocular lenses.

FIG. 3 depicts a schematic view of one embodiment of a system that may be used to measure optical properties of diffractive diffractive lenses. In some embodiments, light source 30 may be an LED. In some embodiments, light source 30 may be formed by reflecting a light spot on a retina. In some embodiments, light from point source 30 may be collimated by intraocular lens 32. In some embodiments, a lens 32 may be positioned in the eye of a patient and light reflected from a light spot on the retina may pass through lens 32. Measurement of the wavefront associated with lens 32 at the eye is desirable. However, positioning a detector close to lens 32 may be problematic. In some embodiments, system 100 may include a relay system (not shown) to enable detection of the wavefront associated with lens 32.

In some embodiments, light passed through intraocular lens 32 may pass through array 37 of lenslets 38. A portion of a wavefront associated with lens 32 may enter each lenslet 38 in array 37. Each lenslet 38 in array 37 may focus the portion of the wavefront that enters lenslet 38 to a spot on a plate of sensors 36.

In some embodiments, the lenslet 38 and sensor may be part of a Hartmann-Shack wavefront sensor 36. In some embodiments, the local slope of array 37 of lenslets 38 is determined and used to reconstruct the wavefront by comparing the position of a light spot focused by each lenslet with the position of the spot for a perfect collimated wavefront, to determine the lateral movement of the spot. This indicates the local slope of the lens for a lenslet in the absence of a diffractive step. When a diffractive step is present, the additional displacement of the spot is determined for the lens design and measurement equipment, and this is used to correct the local wavefront slope so that it represents the underlying monofocal lens. Any tilt or other deviation in the wavefront may be visible as a change from the focus of a perfect plane wave. In some embodiments, a tilt in the local wavefront may be visible as a lateral movement or shift of the focused spot. Other visible differences may be noted for other variations in the array of lenslets.

Wavefront measurement systems used to measure an optical wavefront generally expect a wavefront to be smooth and continuous. Any fluctuations of the slope of the wavefront may not be recorded, which may lead to an error in the average slope value.

Figure 4:
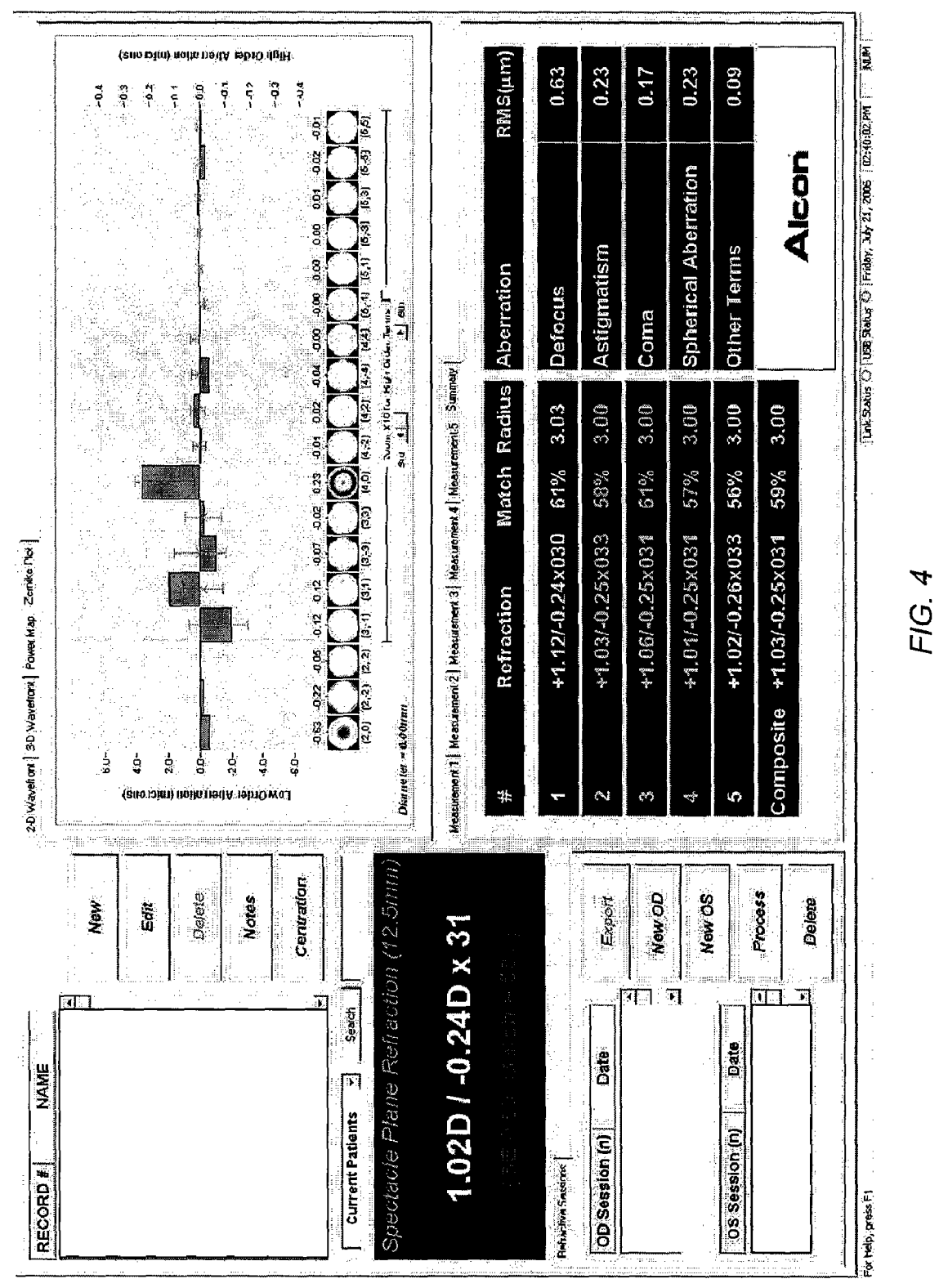

Two common reconstruction methods can be used to reconstruct a wavefront. Zernike fitting may involve fitting the local slopes of array 37 of lenslets 38 to a set of Zernike polynomials. In some embodiments, if only a few Zernike terms are used, higher order deviations of the wavefront may be omitted. FIG. 4 depicts an example of a LADARWave® screenshot in which measured Zernike values are plotted for a lens in a model eye with a small amount of defocus. LADARWave® systems are manufactured by Alcon Laboratories, of Fort Worth, Tex. In some embodiments, measurements of a lens may be based on the lens having a W40 Zernike spherical aberration. Those skilled in the art will appreciate that other aberrations, such as coma and trefoil, may also be evaluated. In the example of a monofocal IOL measured in a model eye in FIG. 4, the spherical aberration value is 0.23 microns.

Spherical aberration is relatively insensitive to lens decentration and lens tilt, whereas other values for other Zernike aberrations may be more sensitive to lens positioning. In some situations, small changes in the model eye position or the position of the lens may cause large redistributions in the Zernike terms, because they represent the best fit of an individualized wavefront.

Figure 5:
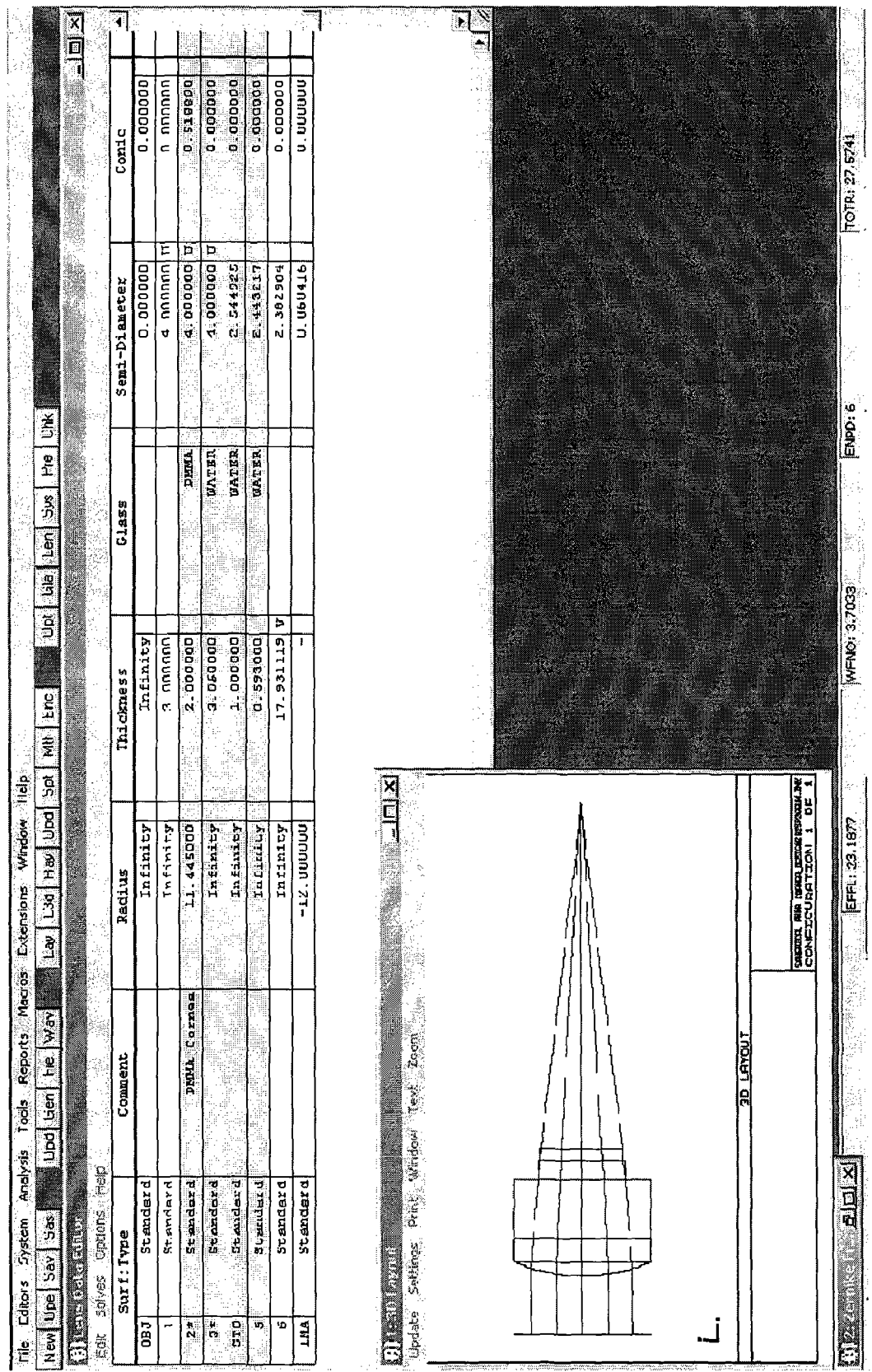
FIG. 5 depicts a screenshot of a Zemax® model eye with a lens using a PMMA cornea.
Figure 6:
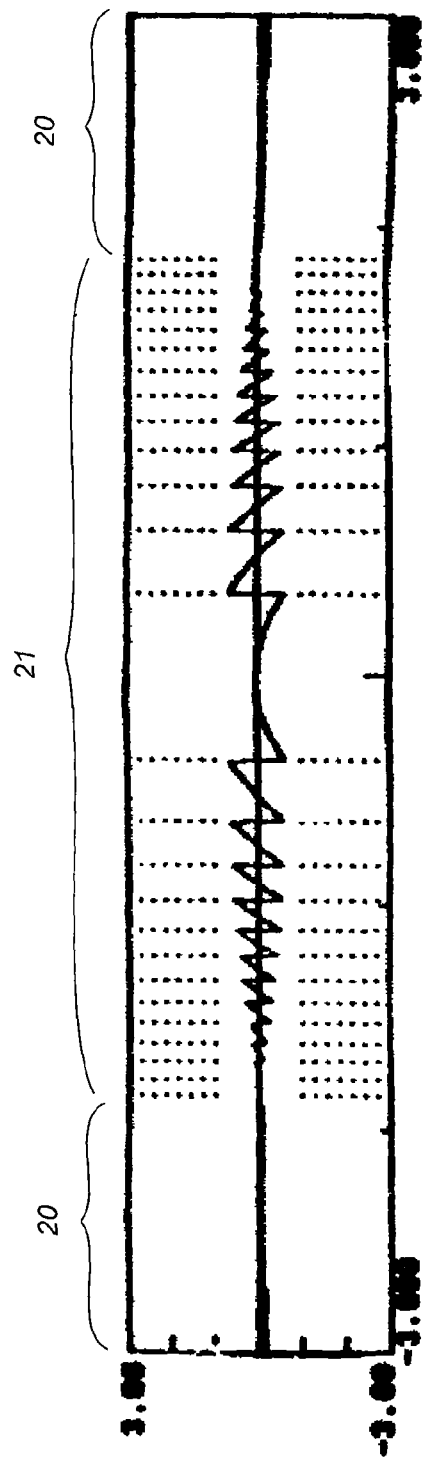
FIG. 6 depicts one embodiment of a diffractive surface profile for one embodiment of a lens which may have diffractive zones and continuous zones.

Optical raytrace software may be used to calculate the Zernike spherical aberration for intraocular lenses 32 for various pupil diameters. For example, Zemax, which is a product of Zemax Development Corporation, of Bellevue, Wash., may be used. In some embodiments, the Zernike spherical aberration may be measured in a laboratory using a model eye. FIG. 5 depicts a model eye containing an IOL FIG. 6 depicts one embodiment of a diffractive surface profile for one embodiment of lens 32 which has apodized diffractive zones 21 and an outer refractive region 20. Those skilled in the art will appreciate that other diffractive profiles are possible. In some situations, lens 32 such as the one profiled in FIG. 6 may produce an output in the form of an array of spots. In some embodiments, evaluation of a lens having zones 20 may produce an array of spots that are similar to spots produced by a monofocal lens. However, lens 32 with different curvatures of the diffractive zones, and discontinuities at the zone boundaries, may produce an array of spots that include double spots, blurred spots or other variations due to diffractive zones or zone boundaries. As depicted in FIG. 6, the deviation from a sphere (in microns) of the slope of lens 32 may vary relative to the radial location (in mm). Zones 21 having larger steps may send more energy to a near focus, while the non-diffractive region 20 may send more energy to a distance focus as the wavefront propagates to the foci.

Figure 7B:
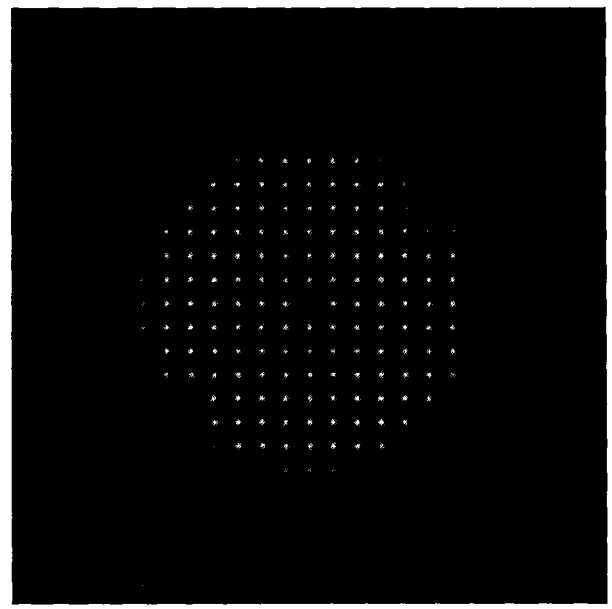
FIGS. 7A and 7B depict examples of arrays of spots that may be formed by passing light through lenses having diffractive surfaces.
Figure 7A:
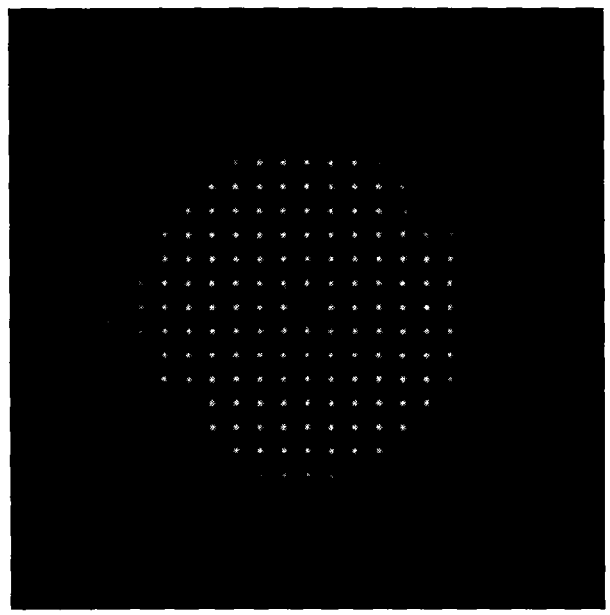

FIGS. 7A and 7B depict examples of arrays of spots that may be formed by passing light through intraocular lenses 32 having diffractive surfaces. FIG. 7A depicts one embodiment of an array of spots that may be the result of light passing through lens 32 in a wet cell. FIG. 7B depicts one embodiment of an array of spots that may be the result of light passing through lens 32 in a model eye. In FIGS. 7A and 7B, a spot is absent near the central portion of the array, which may be due to how lens 32 is positioned on the measuring equipment. In embodiments in which the measurements are taken of lens 32 in a patient, the patient's head may be turned, or they might not be looking directly at the light, or some other factor may occur such that lens 32 is not centered.

Figure 8:
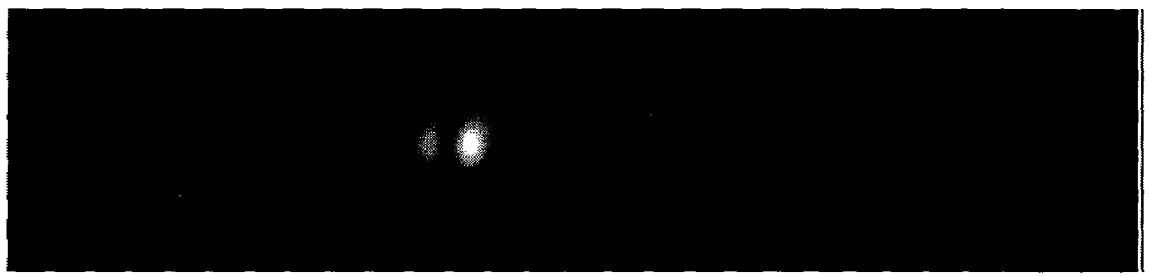
FIG. 8 depicts a representation of a double spot from an output of the array of FIG. 7A or 7B.
Figure 9:
FIG. 9 depicts a representation of a blurred spot from an output of the array of FIG. 7A or 7B.

In some embodiments, the calculation of expected properties of lens 32 may include altering the way a measurement system measures the spot position. Current Hartmann-Shack systems expect only a single spot, and the software may reject details of any spot elongation or a second spot. In some embodiments, lens 32 being measured using a system similar to the system depicted in FIG. 3 may produce an array with double spots. FIG. 8 depicts a representation of a double spot from an output of the array of FIG. 7A or 7B. A double spot may be the result of light passing through lens 32 with a diffractive surface. Even when the wavefront is not tilted, interference between light at different locations across lenslet 38 can cause a double spot with neither of the spots being formed at the location that corresponds to the wavefront tilt. The double spot can be compared to the single spot from a monofocal lens, such as depicted in FIG. 9.

Figure 10:
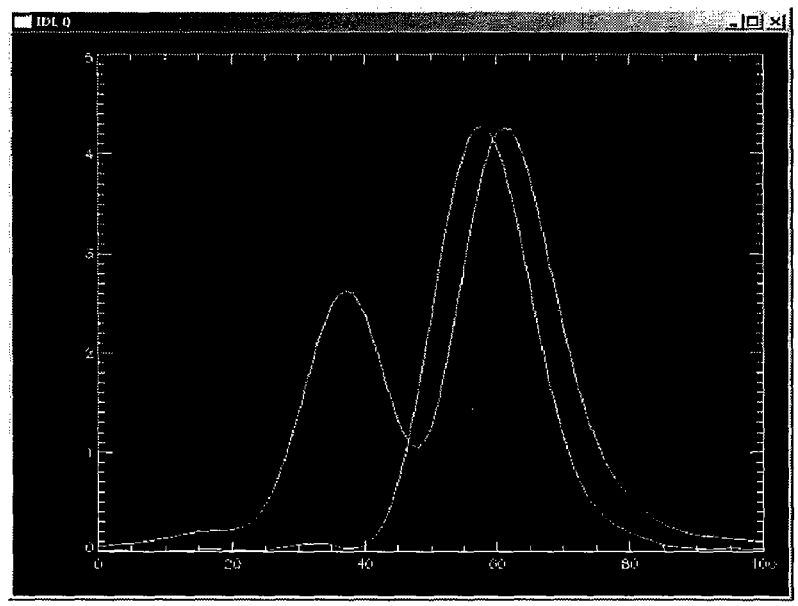
FIG. 10 depicts a graphical representation of a comparison of light intensity for a double spot and a single spot.

In some embodiments, the centroid of a double spot may be used to determine the lateral movement of the spot. In some embodiments, the brighter spot in a double spot may be used to determine the lateral movement of the spot. FIG. 10 depicts a graphical representation of a comparison of light intensity for a double spot and a single spot. In some embodiments, the light intensity for a double spot may result in a light intensity curve having two crests. In some embodiments, the lateral movement of the larger crest associated with a double spot may be used to determine the lateral movement of the spot. In some embodiments, the light intensity for a double spot may be represented by a single spot representing the centroid of the double spot. In some embodiments, the lateral movement of the centroid associated with a double spot may be used to determine the lateral movement of the spot. As depicted in FIG. 10, the lateral movement of the centroid of a double spot may differ from the lateral movement of the brighter of two spots in the double spot.

After determining whether to measure the lateral movement of a spot on the array based on a centroid calculated for the double spot or based on the brighter of two spots in the double spot, a "monofocal equivalent" may be calculated.

The monofocal equivalent lens is a lens with the diffractive structure removed. This has the same aberrations as the monofocal wavefront of the underlying lens. For example, the diffractive surface in FIG. 6 would normally create a wavefront that has a similar appearance to the diffractive surface, and this would propagate to create two primary images at a distance focus and a near focus. The images would also have an apodization component due to a variation of diffraction efficiency across the lens, and this would also affect image quality, though at a more modest level than the effect due to the aberration of the eye. The monofocal equivalent lens would create solely the distance image, with aberrations corresponding to the overall aberrations of the optical system, and with no apodization effect.

The imaging properties of the lenslets can be simulated using Fourier transform calculations of the pupil function at each lenslet.

Figure 11:
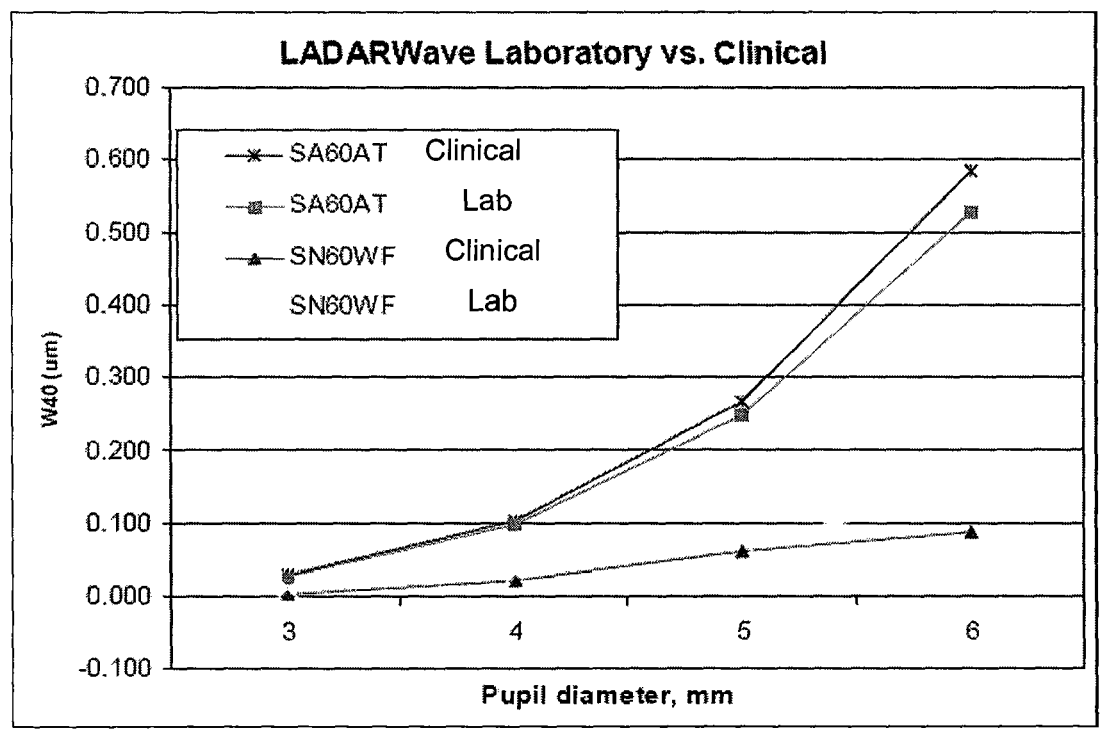
FIG. 11 depicts a graphical representation of a comparison of laboratory and clinical Zernike spherical aberration data (W40) for different pupil diameters.

FIG. 11 depicts a graphical representation of a comparison of laboratory and clinical Zernike spherical aberration data (W40) for different pupil diameters for SA60AT and SN60WF monofocal IOLs. There is excellent agreement between the values, even though the clinical data for real patient eyes also included significant additional aberrations that were not simple Zernike spherical aberration.

Figure 12:
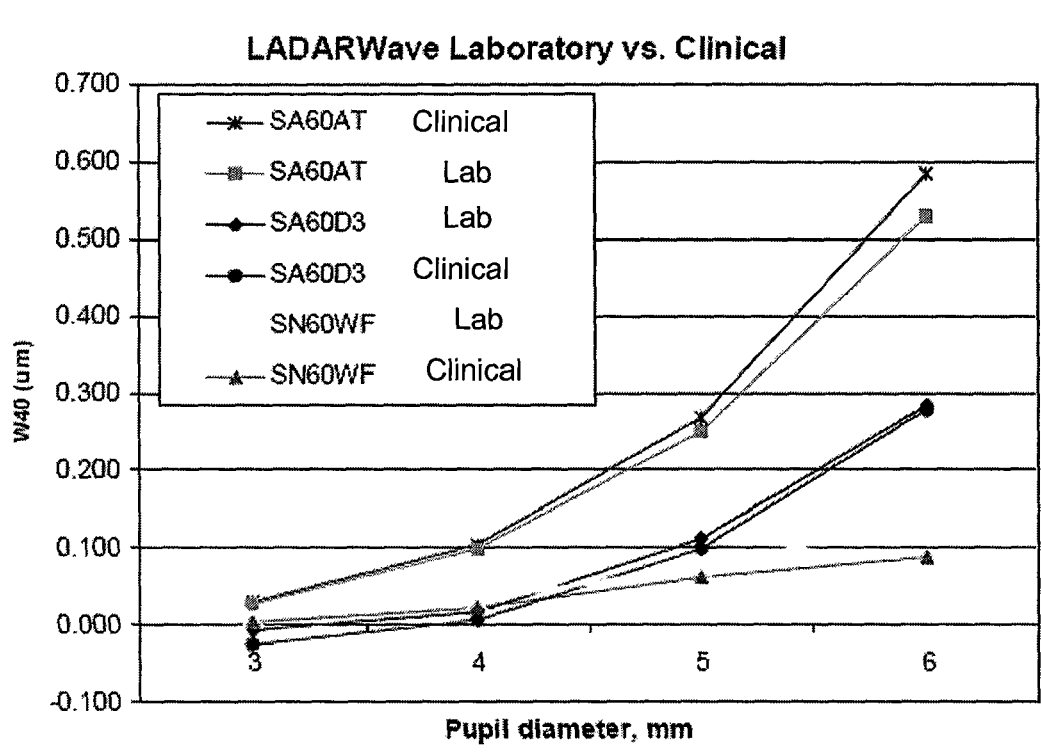
FIG. 12 depicts a graphical representation of a comparison of laboratory and clinical values of a Zernike spherical aberration (W40) for lenses.

FIG. 12 adds laboratory and clinical values to FIG. 11. These are values reported by LADARWave® as Zernike spherical aberration (W40) for the multifocal SA60D3 ReSTOR® intraocular lens 32. This indicates that the spherical aberration has negative values for small pupils, even though this is not actually the case. The apparent spherical aberration that is reported by the LADARwave system can be compensated by theoretical or experimental data.

In some embodiments, a monofocal equivalent may be determined for lens 32. In some embodiments, laboratory values may be compared to theoretical calculations for lenses 32. In some embodiments, a LADARWave® measurement and a theoretical calculation of a Zernike spherical aberration may be compared for various pupil diameters ranging from 3 mm to 6 mm. Theoretical calculations or measurements of lenses 32 having diffractive surfaces may be determined. FIG. 13 depicts graphical representations of model eye measurements compared with calculations for SA60D3 diffractive lenses having various pupil diameters ranging from 3 mm to 6 mm. In some embodiments, a LADARWave® measurement and a theoretical calculation of a Zernike spherical aberration may be compared for various pupil diameters ranging from 3 mm to 6 mm. The difference between the theoretical calculation and the measured value can be used to adjust the data to reflect the monofocal equivalent value.

FIG. 14 depicts a sketch of a wavefront that summarizes the measurement of a diffractive lens 32. As depicted in FIG. 14, the wavefront may have a base curve 35. Base curve 35 for a diffractive lens 32 may be the same or approximately the same as a base curve for a monofocal lens. FIG. 14 further illustrates an approximate size of a lenslet, such as lenslet 38 described above relating to FIG. 3, relative to the wavefront. In some embodiments, the size of lenslet 38 may determine the accuracy of any measurement of the wavefront. For example, lenslet 38 depicted in FIG. 14 may span more than one step in the wavefront. Using embodiments disclosed herein, a measurement of one or more optical properties may be determined for diffractive lenses 32.

In some embodiments, measuring optical properties of diffractive intraocular lenses 32 may include a cross-check of one or more methods. In some embodiments, experimental image spots may be generated and compared with image spots generated by a system such as described above. FIGS. 15A, 15B and 15C depict screen shots of experimental image spots that may be used to cross-check measurement methods described above. FIGS. 15A, 15B and 15C show image intensities for a ReSTOR® intraocular lens 32 in a wet cell for different locations of a 0.4 mm diameter aperture in front of lens 32. In some embodiments, experimental image spots may be generated similar to a manner in which LADARWave® lenslets 38 generate image spots.

In some embodiments, measuring the optical properties of diffractive lens 32 may include calculating the properties of the wavefront. FIG. 16 depicts a screenshot of the calculation of one quadrant of an array of spots, and this can be replicated for the other quadrants. The calculated appearance of the spots can be used to determine the apparent tilt of the wavefront at that lenslet location, and a correction can be made.

In some embodiments, a Modulation Transfer Function (MTF) may be calculated for diffractive lens 32. In some embodiments, calculating a MTF or the like may provide a desired measurement of an optical property of a diffractive lens 32. The MTF of the monofocal equivalent lens can be used to evaluate the optical effect of the overall aberrations of the lens.

Those skilled in the art will appreciate that methods for measuring diffractive lenses disclosed herein can be applied to alternative zonal lenses. Furthermore, the methods disclosed herein may apply to lenses having 0 diffraction orders, but may also apply to lenses having higher diffraction orders. For example, methods of measuring lenses may include measuring high-order diffractive lenses, which may be in the range of 7-12 over the visible region of the wavelengths.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below.

What is claimed is:

1. A method for measuring optical properties of a diffractive lens, comprising:
    passing light through the diffractive lens and onto an array of lenslets, wherein each lenslet receives a portion of the light and wherein the diffractive lens has a zone boundary covering at least a portion of one lenslet;
    measuring one or more properties of the diffractive lens based on the light generally focused by the array of lenslets and detected by a sensor; and
    adjusting the measured result to compensate for expected optical properties of the diffractive component of the lens in the measurement system.

2. The method of claim 1, wherein the effect of the diffractive structure is calculated utilizing the Fourier transform of the wavefront across each lenslet for the phase delay introduced by the diffractive structure.

3. The method of claim 1, further comprising comparing the position of a light spot focused by each lenslet with the position of the spot for a perfect collimated wavefront, to determine the lateral movement of the spot.

4. The method of claim 3, wherein the effect of the diffractive structure is determined by comparing the measured values for both a diffractive lens and a monofocal-equivalent lens to determine the correction.

5. The method of claim 1, further comprising:
    identifying blurry or double spots, wherein the presence of a blurry or double spot indicates the presence of a diffractive portion of the surface of the lens; and
    adjusting the local slope for the lenslet to represent the monofocal equivalent lens.

6. The method of claim 1, wherein the step of comparing the determined one or more properties of the diffractive lens against one or more expected properties of the diffractive lens comprises determining a monofocal equivalent lens.

7. The method of claim 6, wherein determining a monofocal equivalent lens comprises comparing theoretical calculations and laboratory measurements.

8. The method of claim 6, wherein determining a monofocal equivalent lens comprises comparing theoretical calculations and clinical measurements.

9. The method of claim 1, further comprising determining the best adjustment by comparing two or more of theoretical calculations, laboratory measurements, and clinical measurements.

10. The method of claim 1, further comprising analyzing a portion of the wavefront.

11. The method of claim 1, wherein the step of comparing the determined one or more properties of the diffractive lens against one or more expected properties of the diffractive lens comprises:
  estimating the theoretical distortion of the data based on the lens design; and
  compensating for the estimation of the theoretical distortion.

12. The method of claim 1, wherein the step of comparing the determined one or more properties of the diffractive lens against one or more expected properties of the diffractive lens comprises calculating the approximate lens region that would cover a lenslet to estimate the magnitude of a double spot.

13. The method of claim 1, wherein a lenslet has a diameter smaller than the diffractive zone being measured.

14. The method of claim 1, wherein a lenslet has a diameter larger than the diffractive zone being measured.

15. A method for measuring optical properties of a diffractive lens, comprising:
  passing light through the diffractive lens, wherein the diffractive lens has a zone boundary covering at least a portion of one lenslet;
  using a system designed for measuring optical properties of a lens, measuring one or more properties of the diffractive lens based on the light exited from the lens;
  calculating one or more properties of the diffractive lens to determine an expected one or more properties of the diffractive lens;
  comparing the determined one or more properties of the diffractive lens against the one or more theoretical calculations of the diffractive lens;
  calculating one or more properties of the system used to measure the properties of a lens;
  measuring one or more properties of the system used to measure the properties of a diffractive lens; and
  correcting the measurement of one or more properties of the diffractive lens based on the comparison against the one or more expected properties of the diffractive lens and the one or more properties of the system for measuring properties of a lens.

16. The method of claim 15, wherein measuring one or more properties of the diffractive lens comprises measuring the spherical aberration of a diffractive lens.

* * * * *